(12) United States Patent
Zelinski

(10) Patent No.: US 10,590,817 B1
(45) Date of Patent: Mar. 17, 2020

(54) LIQUID COOLED EXHAUST MANIFOLD

(71) Applicant: Joseph R. Zelinski, Oshkosh, WI (US)

(72) Inventor: Joseph R. Zelinski, Oshkosh, WI (US)

( * ) Notice: Subject to any disclaimer, the term of this patent is extended or adjusted under 35 U.S.C. 154(b) by 38 days.

(21) Appl. No.: 16/004,560

(22) Filed: Jun. 11, 2018

(51) Int. Cl.
*F01N 3/04* (2006.01)
*F01N 13/18* (2010.01)
*B63H 21/32* (2006.01)
*F01N 13/00* (2010.01)

(52) U.S. Cl.
CPC ......... *F01N 3/046* (2013.01); *F01N 13/1827* (2013.01); *B63H 21/32* (2013.01); *F01N 13/004* (2013.01); *F01N 2260/024* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,206,836 | A * | 9/1965 | Schlussler | B21C 37/29 29/890.08 |
| 5,148,675 | A * | 9/1992 | Inman | F01N 3/043 60/321 |
| 6,230,490 | B1 * | 5/2001 | Suzuki | F01N 13/08 60/321 |
| 7,827,690 | B1 * | 11/2010 | Zelinski | F01N 3/046 29/890.038 |
| 8,291,699 | B2 * | 10/2012 | Payri Gonzalez | F01N 13/10 60/280 |
| 2010/0229540 | A1 | 9/2010 | Waggoner et al. | |
| 2013/0098007 | A1 * | 4/2013 | Waggoner | F01N 3/046 60/299 |

OTHER PUBLICATIONS

Hardin Marine Seaward Series marine exhaust manifold, www.hardin-marine.com.

* cited by examiner

*Primary Examiner* — Binh Q Tran
(74) *Attorney, Agent, or Firm* — Donald J. Ersler

(57) ABSTRACT

A liquid cooled exhaust manifold preferably includes an exhaust open-ended manifold, at least two exhaust tubes, an input port and an outlet tube plate. The exhaust open-ended manifold includes an inner cavity. The input port is formed as an inlet of the exhaust open-ended manifold housing and an exhaust opening is formed as an outlet of the exhaust open-ended hollow housing. The at least two exhaust tubes are inserted through the exhaust opening into input port. An opposing end of the at least two exhaust tubes are retained by the outlet tube plate, which is attached to the outlet. A second embodiment includes a dual open-ended manifold, at least two exhaust tubes, an inlet tube plate and an outlet tube plate. A third embodiment includes an inlet open-ended manifold, at least two exhaust tubes, an inlet tube plate and an outlet port. The liquid cooled exhaust manifold includes additional embodiments.

20 Claims, 18 Drawing Sheets

LIQUID COOLED EXHAUST MANIFOLD

BACKGROUND OF THE INVENTION

1. Field of the Invention

The present invention relates generally to marine exhaust systems and more specifically to a liquid cooled exhaust manifold, which includes individual exhaust pipes retained inside a hollow housing.

2. Discussion of the Prior Art

It appears that the prior art does not teach or suggest a liquid cooled exhaust manifold. Patent publication no. 2010/0229540 to Waggoner et al. discloses a combination liquid-cooled exhaust manifold assembly and catalytic converter assembly for a marine engine. Hardin Marine sells a Seaward Series liquid cooled exhaust manifold having including a cast exhaust manifold and a water cover. The water cover includes an inlet opening and an exhaust opening. The water cover is placed over the cast exhaust manifold. The inlet opening and the outlet opening are welded to the cast exhaust manifold. The inner area of the water cover is filled with water for cooling the cast exhaust manifold.

Accordingly, there is a clearly felt need in the art for a liquid cooled exhaust manifold, which includes individual exhaust pipes retained inside a hollow housing.

SUMMARY OF THE INVENTION

The present invention provides a liquid cooled exhaust manifold, which includes individual exhaust pipes retained inside a hollow housing. The liquid cooled exhaust manifold preferably includes an exhaust open-ended manifold, at least two exhaust tubes and an outlet tube plate. The exhaust open-ended manifold includes an inner cavity. An input port is formed as an inlet of the exhaust open-ended manifold housing and an exhaust opening is formed as an outlet of the exhaust open-ended hollow housing. An inlet water threaded tap is formed through the exhaust open-ended manifold, adjacent the input port and an outlet water threaded tap is formed through the exhaust open-ended manifold, adjacent the exhaust opening. The inlet port includes at least two inlet tube bores for receiving one end of the at least two exhaust tubes. An exhaust flange surrounds a perimeter of the exhaust opening. The outlet tube plate includes at least two exhaust tube bores for receiving an opposing end of the at least two exhaust tubes and a plurality of fastener holes. The outlet tube plate is sealed to the exhaust flange with a sealing component, such as a gasket or o-ring and retained against the hollow housing with a plurality of fasteners.

Each end of the exhaust tube is preferably rolled-over and an o-ring groove is formed in the rolled-over section. At assembly, one end of each exhaust tube is inserted through the exhaust opening and into one of the inlet tube bores. The at least two tube bores in the outlet tube plate are pushed over the opposing end of the at least two exhaust tubes. The outlet tube plate is then fastened to the exhaust flange with the plurality of fasteners. A water supply tube is threaded into the inlet water threaded tap and a water return tube is threaded into the outlet water threaded tap. The water supply tube and the water return tube circulate water through inner cavity of the exhaust open ended manifold.

A second embodiment of the liquid cooled exhaust manifold preferably includes a dual open-ended manifold, the at least two exhaust tubes, an inlet tube plate and the outlet tube plate. The dual open-ended manifold casting preferably includes an open-ended hollow housing. The dual open-ended hollow housing includes an inner cavity. An inlet opening is formed as an inlet to the dual open-ended manifold and an exhaust opening is formed in an outlet of the dual open-ended hollow manifold. An inlet water threaded tap is formed through the dual open-ended manifold, adjacent the inlet opening and an outlet water threaded tap is formed through the dual open-ended manifold, adjacent the outlet opening. A plurality of bolt bosses are formed around a perimeter of the inlet opening to receive a plurality of threaded fasteners.

The inlet tube plate includes at least two inlet tube bores and a plurality of fastener holes. The inlet tube plate is sealed to the inlet opening with a sealing component, such as a gasket or an o-ring and retained against the dual open-ended manifold with a plurality of fasteners. The outlet tube plate is sealed to the exhaust flange with a sealing component, such as a gasket or o-ring and retained against the hollow housing with the plurality of fasteners. At assembly, one end of each exhaust tube is inserted through the exhaust opening and into one of the inlet tube bores in the inlet tube plate. The at least two exhaust tube bores in the outlet tube plate are pushed over the opposing end of the at least two exhaust tubes. The outlet tube plate is then fastened to the exhaust flange with the plurality of fasteners. A water supply tube is threaded into the inlet water threaded tap and a water return tube is threaded into the outlet water threaded tap. The water supply tube and the water return tube circulate water through inner cavity of the hollow housing.

A third embodiment of the liquid cooled exhaust manifold preferably includes an inlet open-ended manifold, the at least two exhaust tubes and the inlet tube plate. The inlet open-ended manifold includes an inner cavity. An inlet opening is formed as an inlet of the inlet open-ended manifold and an exhaust port is formed as an outlet of the inlet open-ended manifold. The exhaust port includes at least two exhaust tube bores for receiving an opposing end of the at least two exhaust tubes. At assembly, an opposing end of each exhaust tube is inserted through the inlet opening and into one of the exhaust tube bores in the exhaust port. The at least two inlet tube bores in the inlet tube plate are pushed over the one end of the at least two exhaust tubes. The inlet tube plate is then fastened to the inlet opening with the plurality of fasteners. A water supply tube is threaded into the inlet water threaded tap and a water return tube is threaded into the outlet water threaded tap. The water supply tube and the water return tube circulate water through inner cavity of the hollow housing.

A fourth embodiment of a liquid cooled exhaust manifold preferably includes a horizontally split exhaust open-ended manifold, the at least two exhaust tubes and an outlet tube plate. A fifth embodiment of a liquid cooled exhaust manifold preferably includes a vertically split exhaust open-ended manifold, the at least two exhaust tubes and an outlet tube plate. A sixth embodiment of a liquid cooled exhaust manifold preferably includes the exhaust open-ended manifold, at least two top bent exhaust tubes, an exhaust elbow and an outlet tube plate. A seventh embodiment of a liquid cooled exhaust manifold preferably includes the exhaust open-ended manifold, the at least two top bent exhaust tubes, at least two exhaust elbow tubes, an exhaust elbow and three outlet tube plates.

Accordingly, it is an object of the present invention to provide a liquid cooled exhaust manifold, which includes individual exhaust pipes retained inside a hollow housing.

These and additional objects, advantages, features and benefits of the present invention will become apparent from the following specification.

DETAILED DESCRIPTION OF THE PREFERRED EMBODIMENTS

Figure 1:
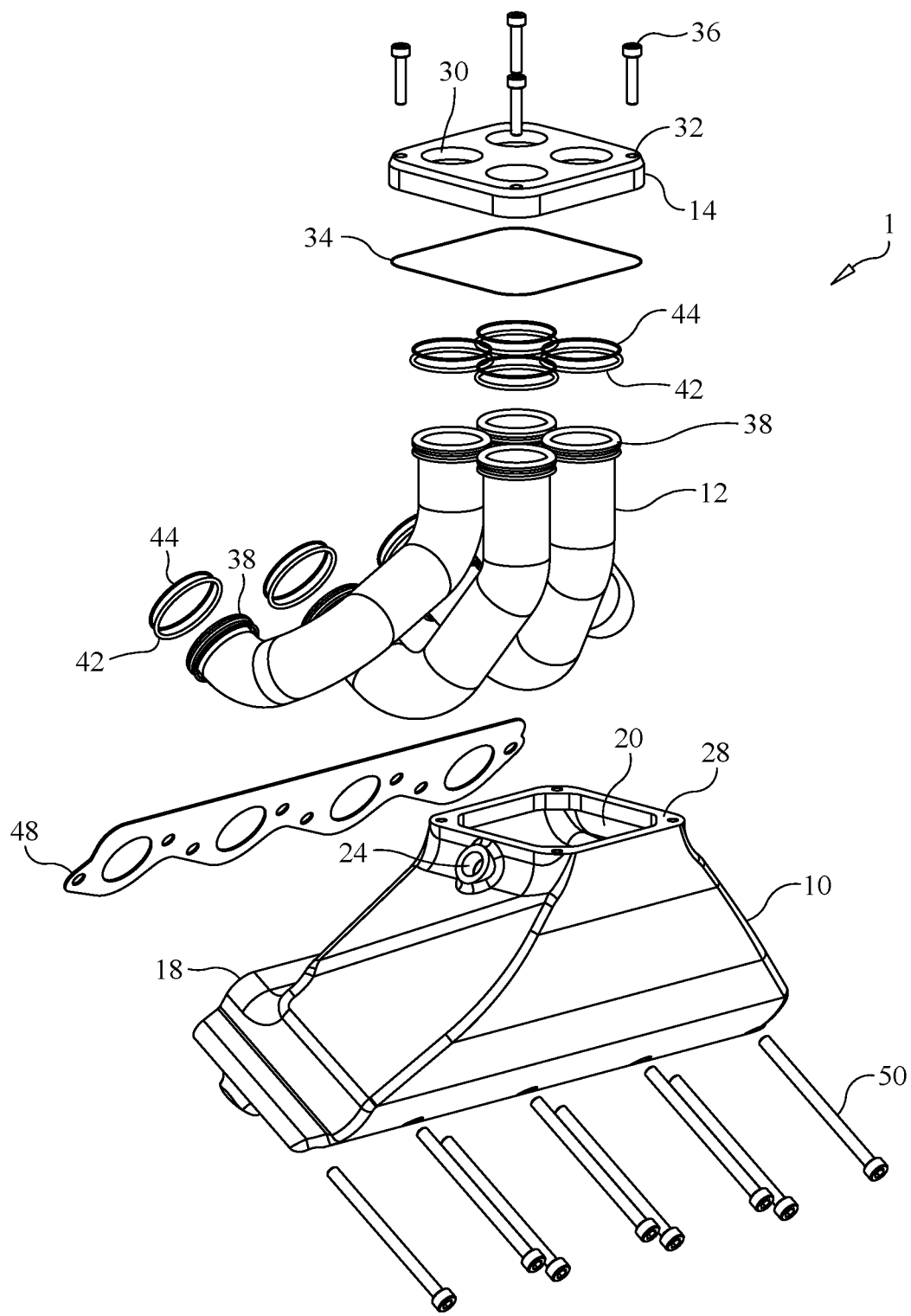
FIG. 1 is an exploded perspective view of a liquid cooled exhaust manifold in accordance with the present invention.
Figure 6:
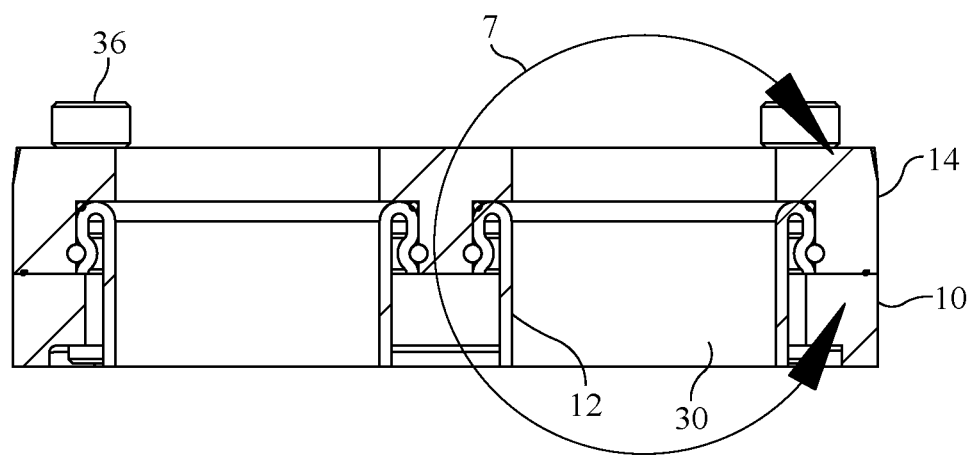
FIG. 6 is a partial cross sectional view cut through FIG. 3 of a liquid cooled exhaust manifold in accordance with the present invention.
Figure 7:
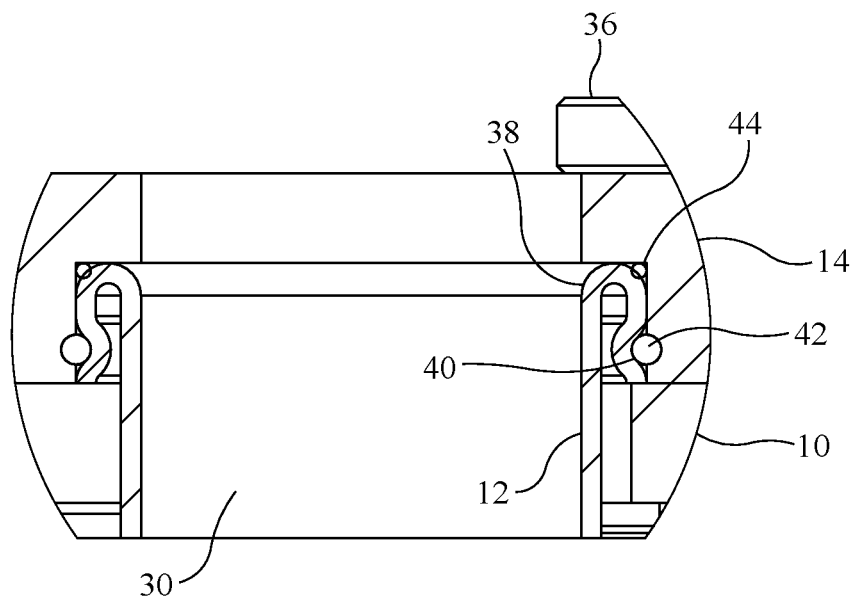
FIG. 7 is an enlarged cross sectional view cut through FIG. 6 of a liquid cooled exhaust manifold in accordance with the present invention.

With reference now to the drawings, and particularly to FIG. 1, there is shown an exploded perspective view of a liquid cooled exhaust manifold 1. With reference to FIGS. 2-5, the liquid cooled exhaust manifold 1 preferably includes an exhaust open-ended manifold 10, at least two exhaust tubes 12 and an outlet tube plate 14. The exhaust open-ended manifold 10 includes an inner cavity 16 and is preferably a casting. However, the exhaust open-ended manifold 10 may be fabricated from stampings, high temperature plastic, 3D printing or any other suitable manufacturing method. The at least two exhaust tubes 12 are bent to conform to a shape of the inner cavity 16. An inlet port 18 is formed as an inlet of the exhaust open-ended manifold 10 and an exhaust opening 20 is formed as an outlet of the exhaust open-ended manifold 10. An inlet water threaded tap 22 is formed through the exhaust open-ended manifold 10, adjacent the inlet port 18 and an outlet water threaded tap 24 is formed through the exhaust open-ended manifold 10, adjacent the exhaust opening 20. However, other methods of circulating water through the exhaust open-ended manifold 10 may also be used. The inlet port 18 includes at least two inlet tube bores 26 for receiving one end of the at least two exhaust tubes 12. The at least two inlet tube bores 26 are formed on a backside of the inlet port 18. An exhaust flange 28 surrounds a perimeter of the exhaust opening 20. With reference to FIGS. 6-7, the outlet tube plate 14 includes at least two exhaust tube bores 30 for receiving an opposing end of the at least two exhaust tubes 12 and a plurality of fastener holes 32. The at least two exhaust tube bores 30 are formed on a backside of the outlet tube plate 18. The outlet tube plate 14 is sealed to the exhaust flange 28 with a sealing component 34, such as a gasket or o-ring and retained against the exhaust open-ended manifold 10 with a plurality of fasteners 36.

Figure 1A:
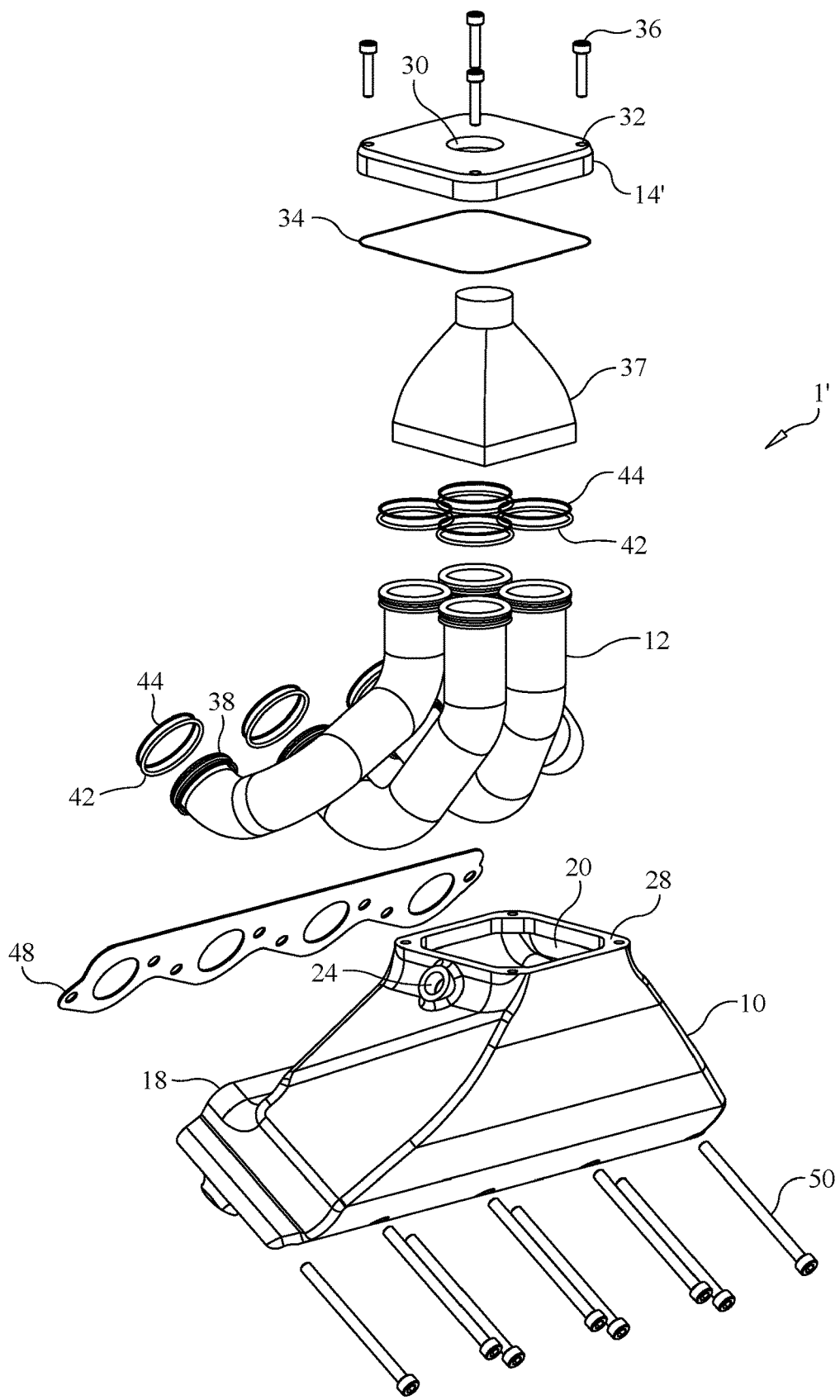
FIG. 1a is an exploded perspective view of a liquid cooled exhaust manifold including a four to one exhaust collector in accordance with the present invention.
Figure 1B:
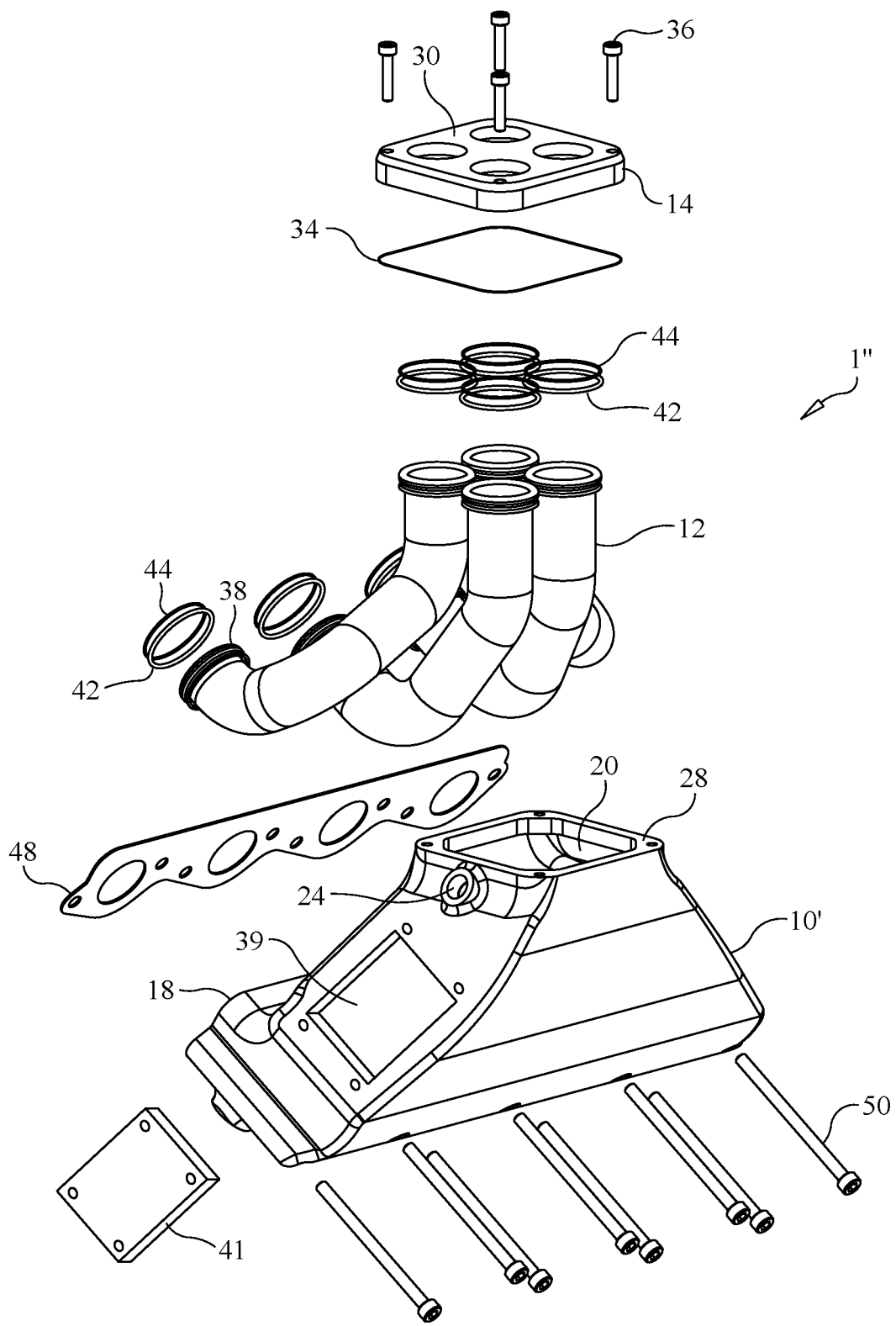
FIG. 1b is an exploded perspective view of a liquid cooled exhaust manifold with a side access plate in accordance with the present invention.
Figure 2:
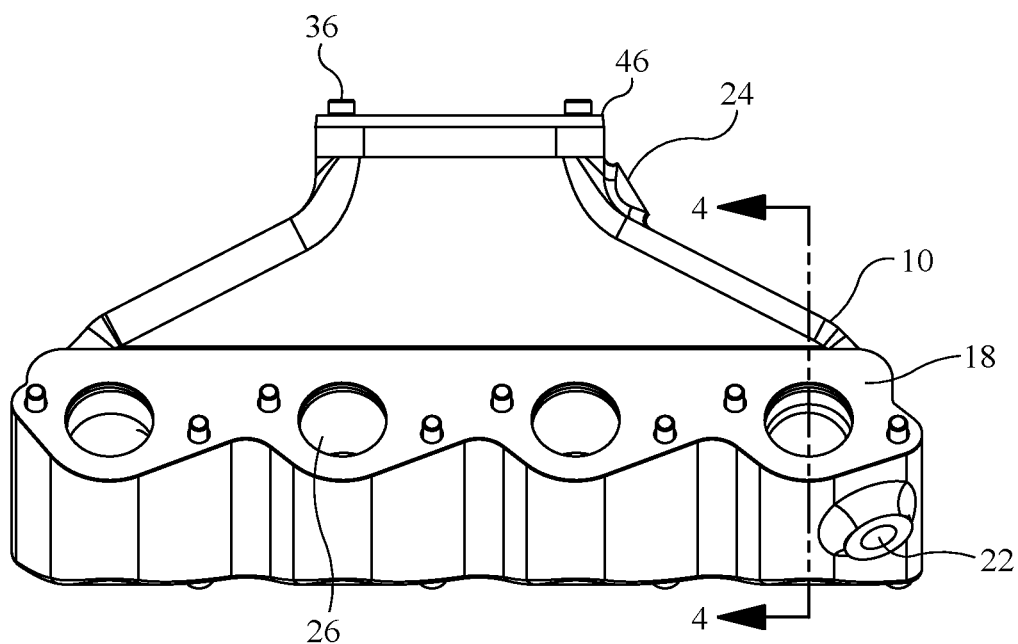
FIG. 2 is a front view of a liquid exhaust cooled manifold in accordance with the present invention.
Figure 3:
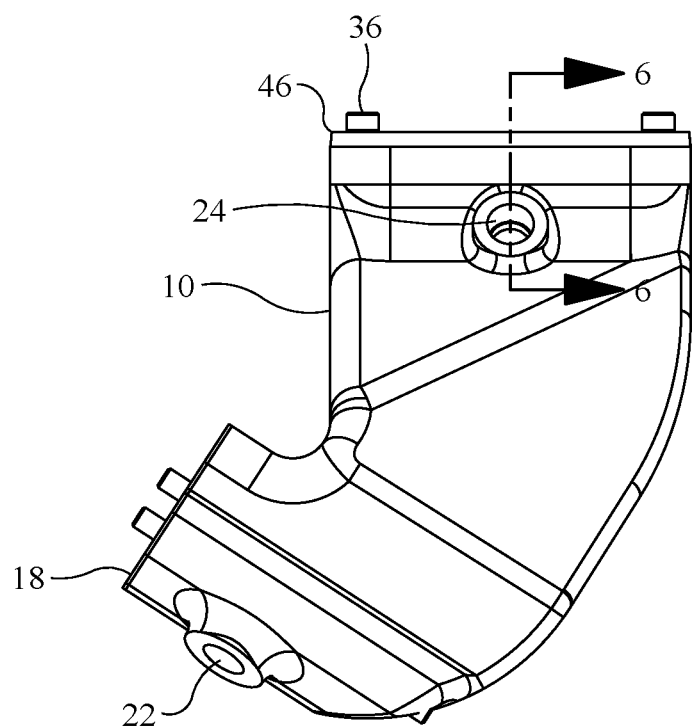
FIG. 3 is a side view of a liquid cooled exhaust manifold in accordance with the present invention.
Figure 4:
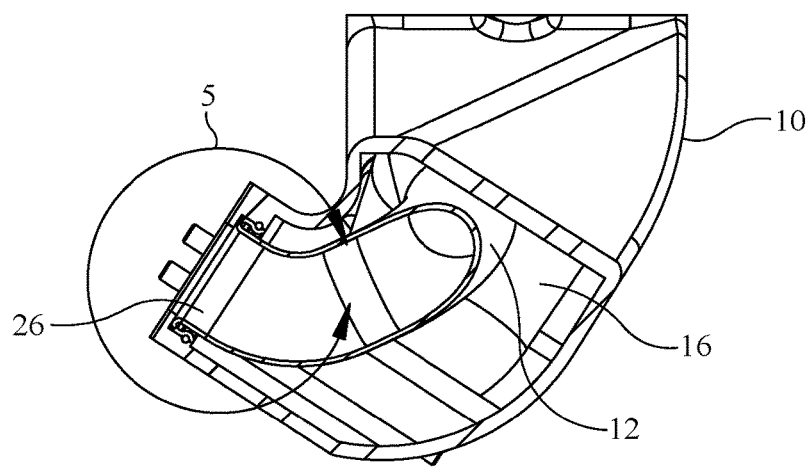
FIG. 4 is a partial cross sectional view cut through FIG. 2 of a liquid cooled exhaust manifold in accordance with the present invention.

With reference to FIG. 1a, a liquid cooled exhaust manifold 1' includes a four to one exhaust collector 37 is inserted between an outlet tube plate 14' and the at least two exhaust tubes 12. The outlet tube plate 14' includes a single exhaust tube bore 30 and the plurality of fastener holes 32. With reference to FIG. 1b, a liquid cooled exhaust manifold 1" includes an exhaust open-ended manifold 10' having an access port 39. The access port 39 is sealed with a gasket (not shown), a plurality of fasteners (not shown) and an access plate 41. With reference to FIGS. 6-7, the outlet tube plate 14 includes at least two exhaust tube bores 30 for receiving an opposing end of the at least two exhaust tubes 12 and a plurality of fastener holes 32. The at least two exhaust tube bores 30 are formed on a backside of the outlet tube plate 18. The outlet tube plate 14 is sealed to the exhaust flange 28 with a sealing component 34, such as a gasket or o-ring and retained against the exhaust open-ended manifold 10 with a plurality of fasteners 36.

Figure 5:
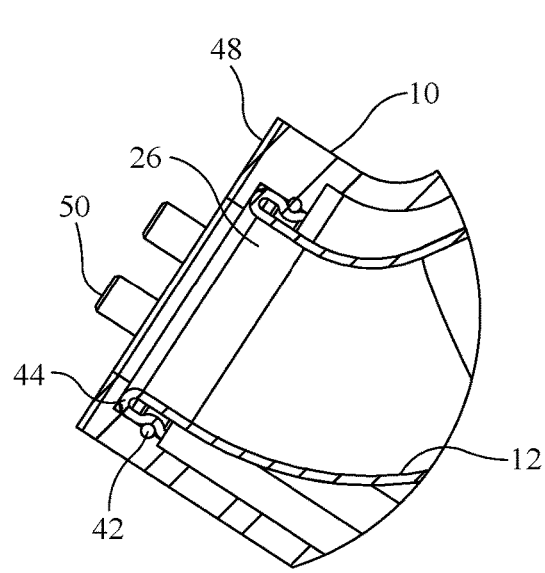
FIG. 5 is an enlarged cross sectional view cut through FIG. 4 of a liquid cooled exhaust manifold in accordance with the present invention.
Figure 5A:
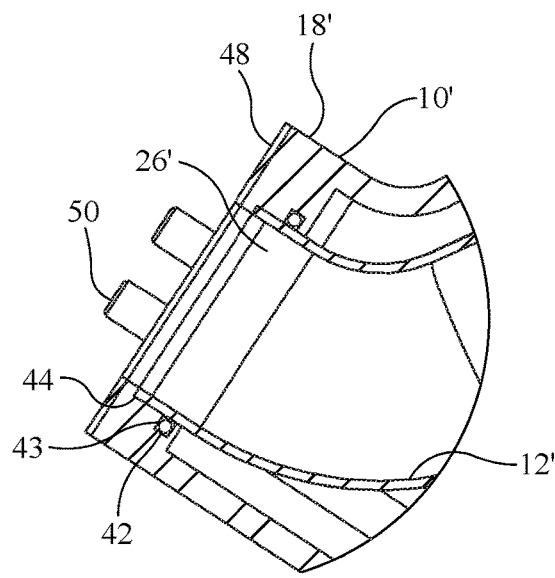
FIG. 5a is an enlarged cross sectional view cut through FIG. 4 of a liquid cooled exhaust manifold with an exhaust tube having a straight end in accordance with the present invention.
Figure 7A:
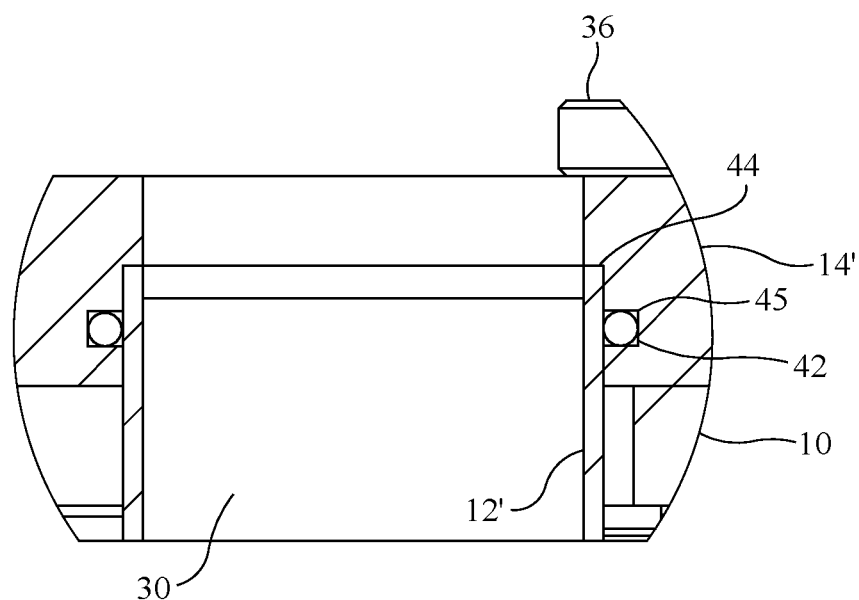
FIG. 7a is an enlarged cross sectional view cut through FIG. 6 of a liquid cooled exhaust manifold with an exhaust tube having a straight end in accordance with the present invention.
Figure 8:
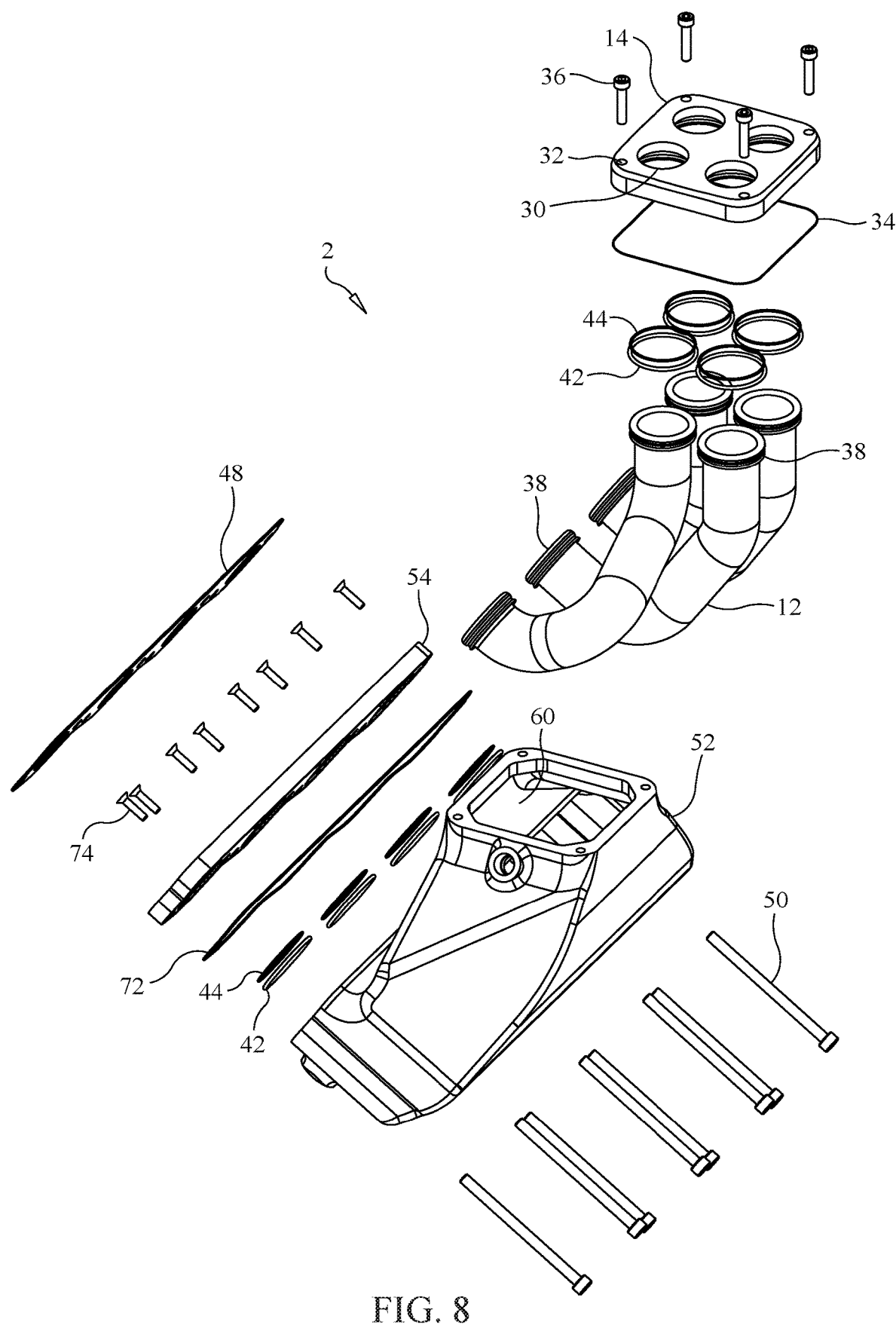
FIG. 8 is an exploded perspective view of a second embodiment of a liquid cooled exhaust manifold in accordance with the present invention.
Figure 9:
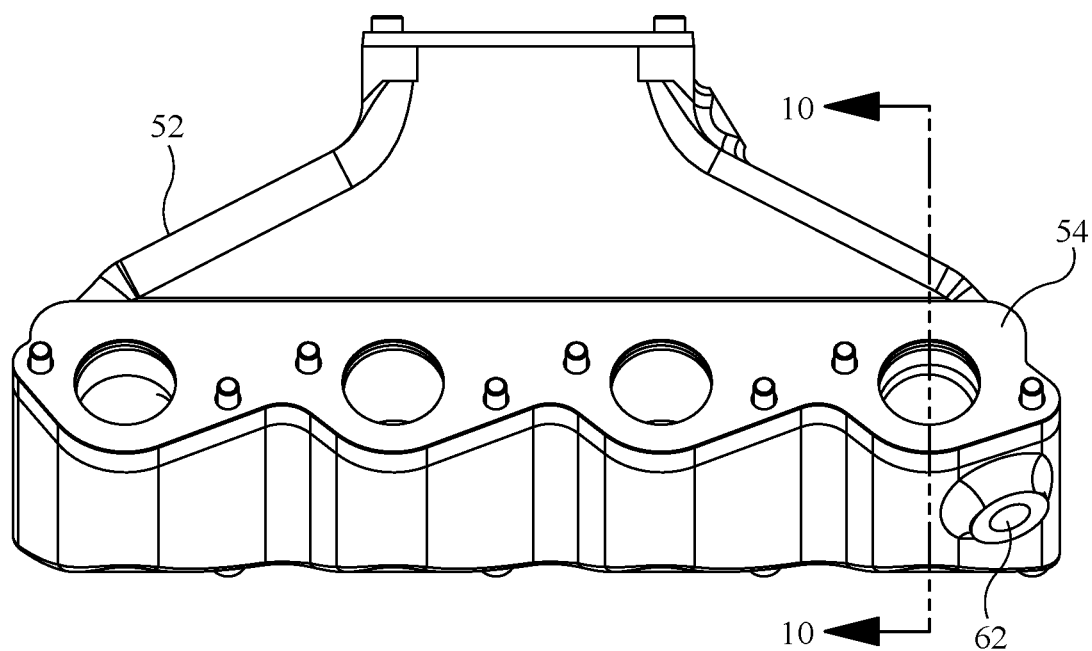
FIG. 9 is a front view of a second embodiment of a liquid exhaust cooled manifold in accordance with the present invention.
Figure 10:
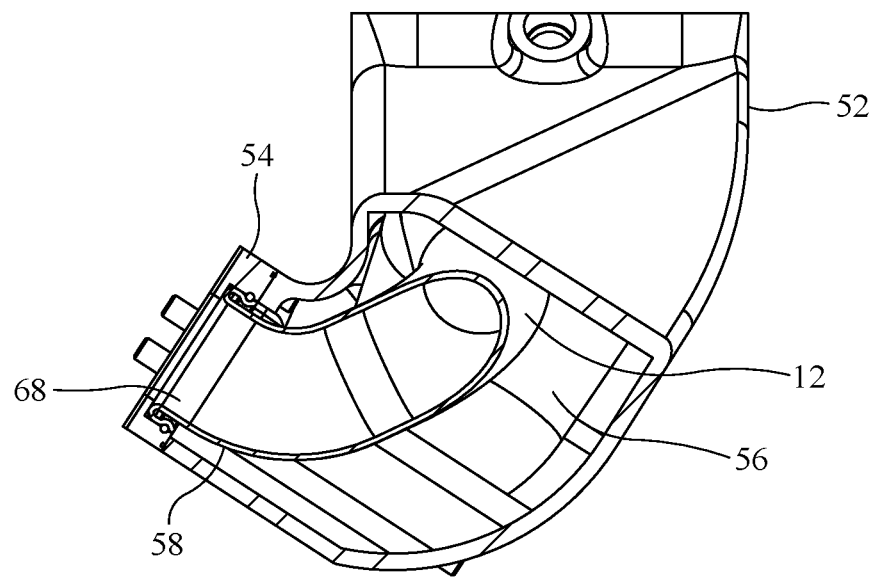
FIG. 10 is a partial cross sectional view cut through FIG. 9 of a second embodiment of a liquid cooled exhaust manifold in accordance with the present invention.
Figure 11:
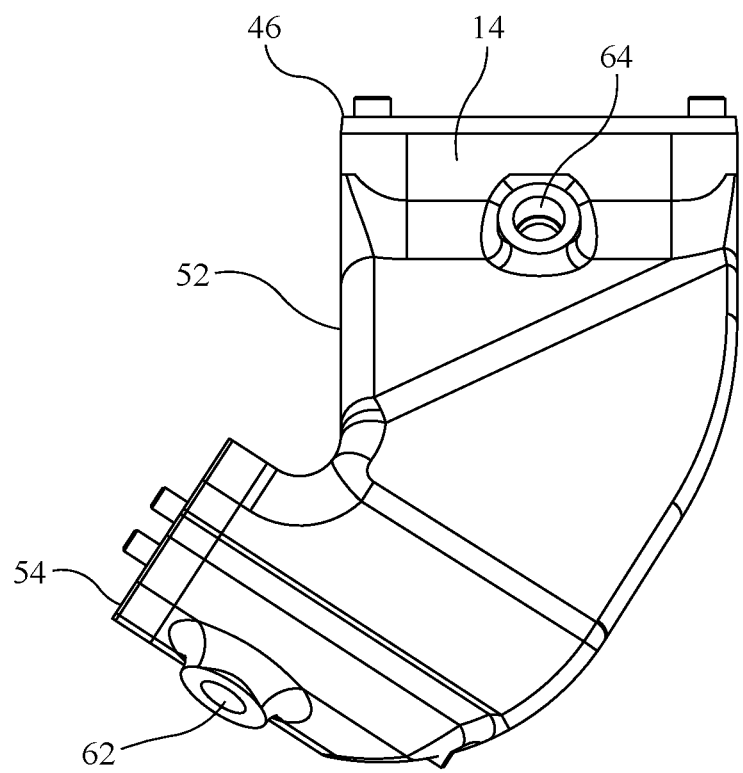
FIG. 11 is a side view of a second embodiment of a liquid exhaust cooled manifold in accordance with the present invention.

Each end of the exhaust tube 12 is preferably rolled-over and an o-ring groove 40 is formed in the rolled-over section 38. However, an o-ring groove may be formed on each end of the exhaust tube 12 by attaching a separate, such as a flange or the like. The o-ring groove 40 is sized to receive an o-ring 42. A corner o-ring 44 is preferably retained at a bottom of the inlet tube bore 26 and the exhaust tube bore 30. With reference to FIG. 5a, the exhaust tube 12' includes two straight ends. The inlet straight end is retained in an inlet tube bore 26'. The inlet tube bore 26' includes an o-ring groove 43 to retain the o-ring 42. With reference to FIG. 7a, the outlet straight end of the exhaust tube 12' is retained in an outlet tube bore 30'. The outlet tube bore 30' includes an o-ring groove 45 to retain the o-ring 42. At assembly, one end of each exhaust tube 12, 12' is inserted through the exhaust opening 20 and into one of the inlet tube bores 26, 26'. The at least two exhaust tube bores 30, 30' in the outlet tube plate 14, 14' are pushed over the opposing end of the at least two exhaust tubes 12, 14'. The outlet tube plate 14, 14' is then fastened to the exhaust flange with the sealing component 34, plurality of fasteners 36 and an optional exhaust gasket 46. The input port 18, 18' of the exhaust open-ended manifold 10, 10' is attached to an exhaust manifold of an engine (not shown) with an inlet gasket 48 and a plurality of fasteners 50. The plurality of fasteners 50 are inserted through holes in the exhaust open ended manifold 10, 10'. A water supply tube (not shown) is threaded into the inlet water threaded tap 22 and a water return tube (not shown) is threaded into the outlet water threaded tap 24. The water supply tube and the water return tube circulate water through inner cavity 16 of the exhaust open-ended manifold 10, 10'.

Figure 12:
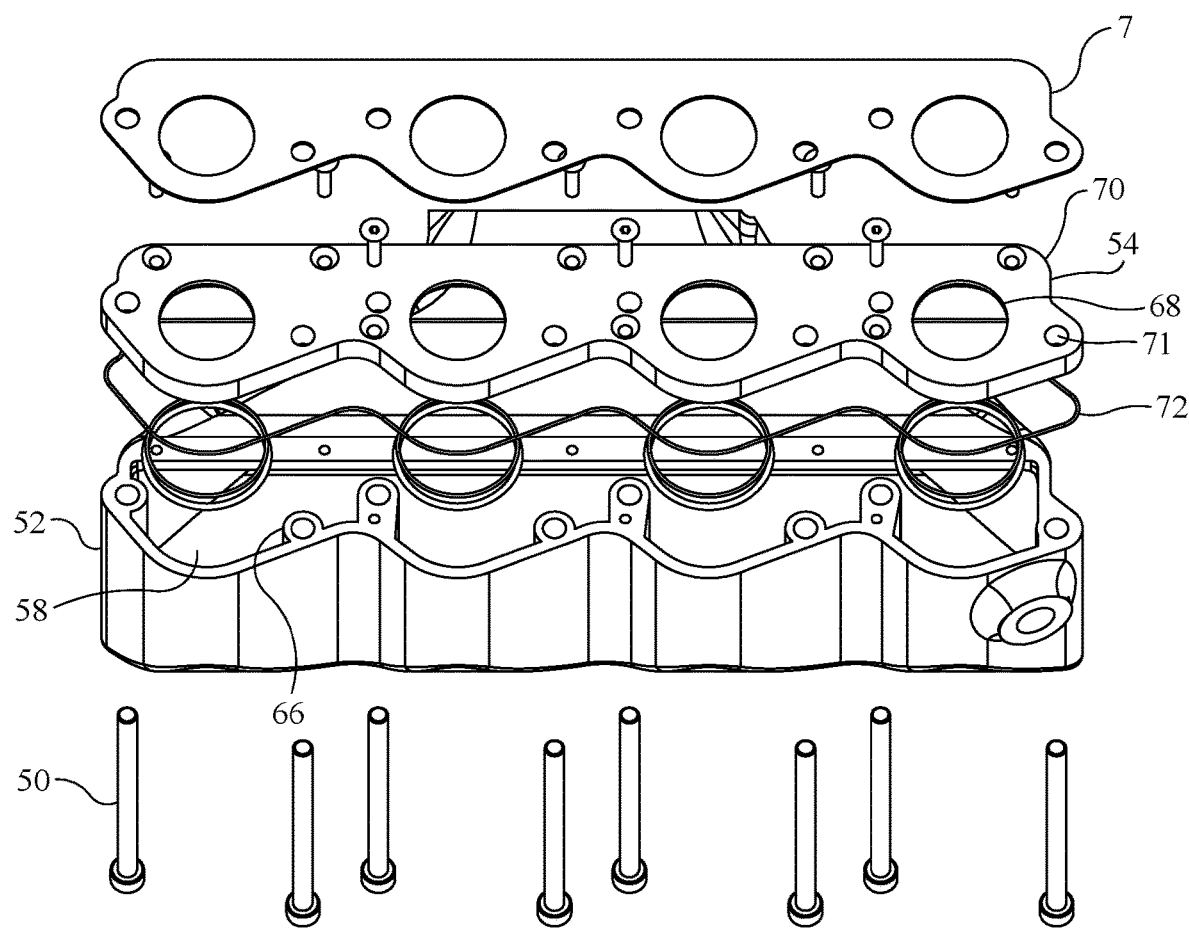
FIG. 12 is a front exploded perspective view of a second embodiment of a liquid cooled exhaust manifold in accordance with the present invention.
Figure 13:
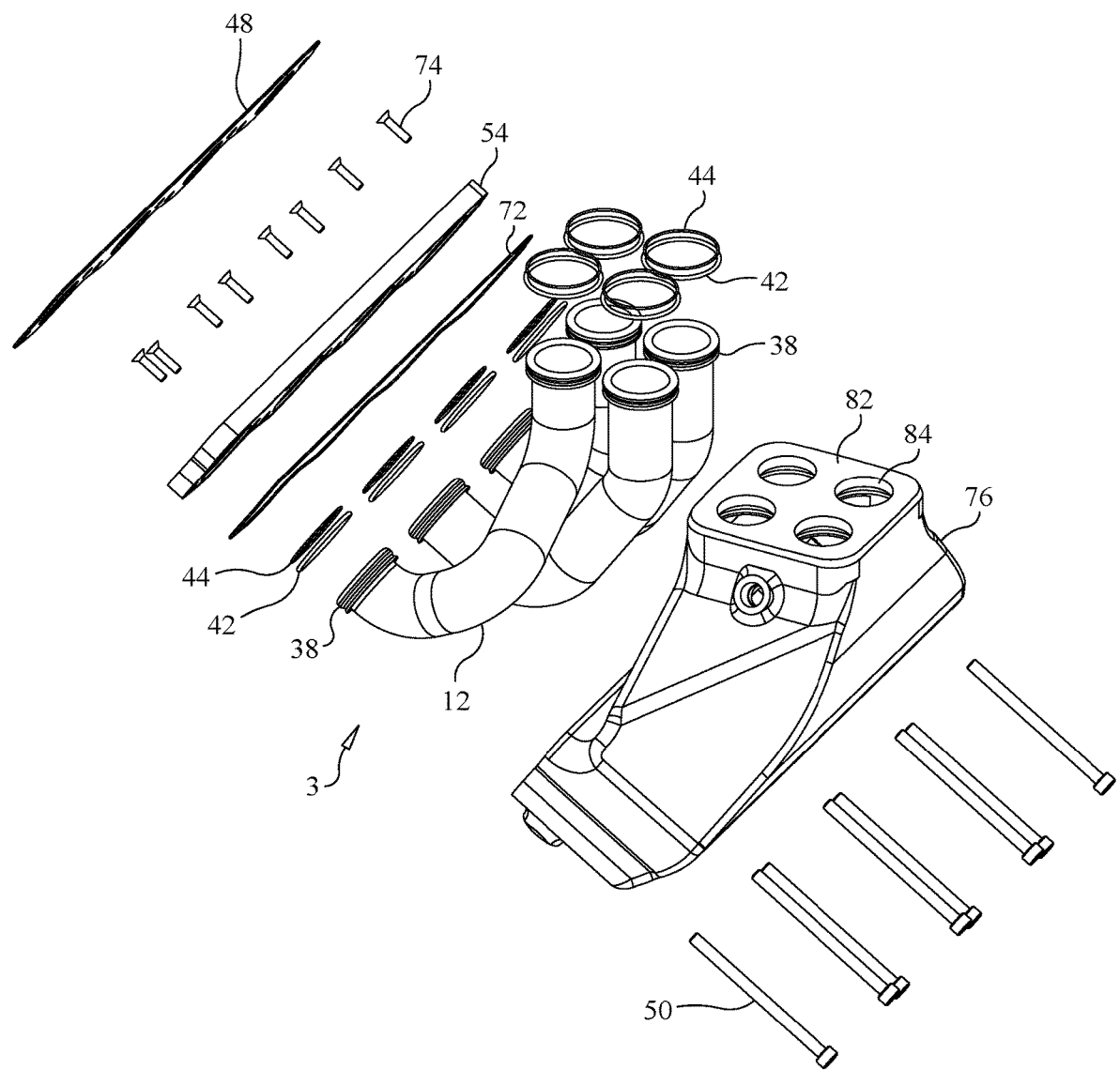
FIG. 13 is an exploded perspective view of a third embodiment of a liquid cooled exhaust manifold in accordance with the present invention.
Figure 14:
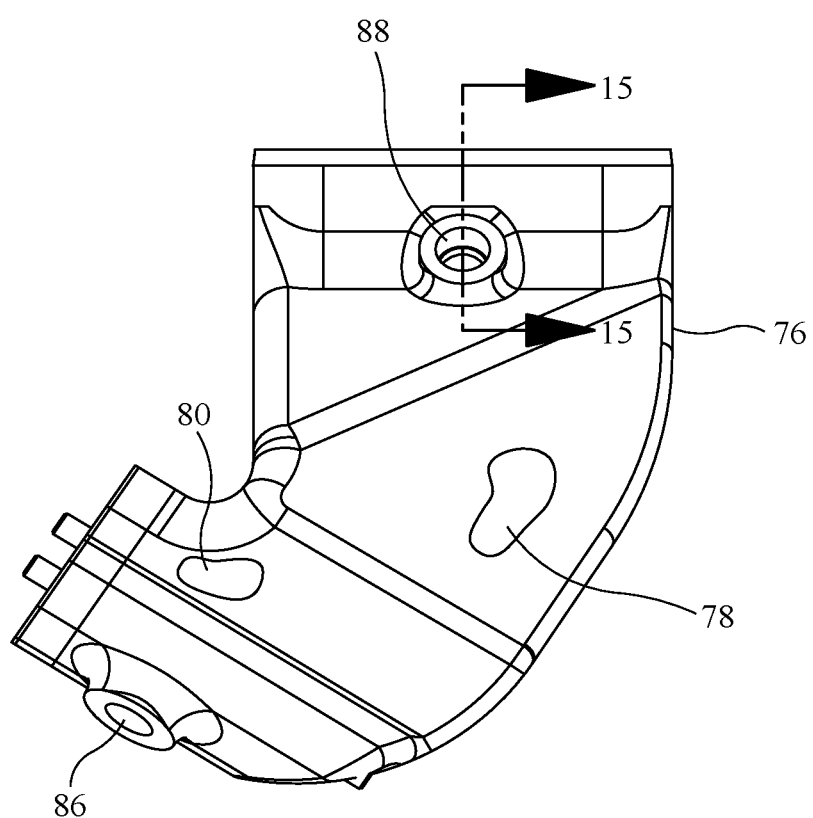
FIG. 14 is a side view of an outlet open-ended manifold of a third embodiment of a liquid exhaust cooled manifold in accordance with the present invention.
Figure 15:
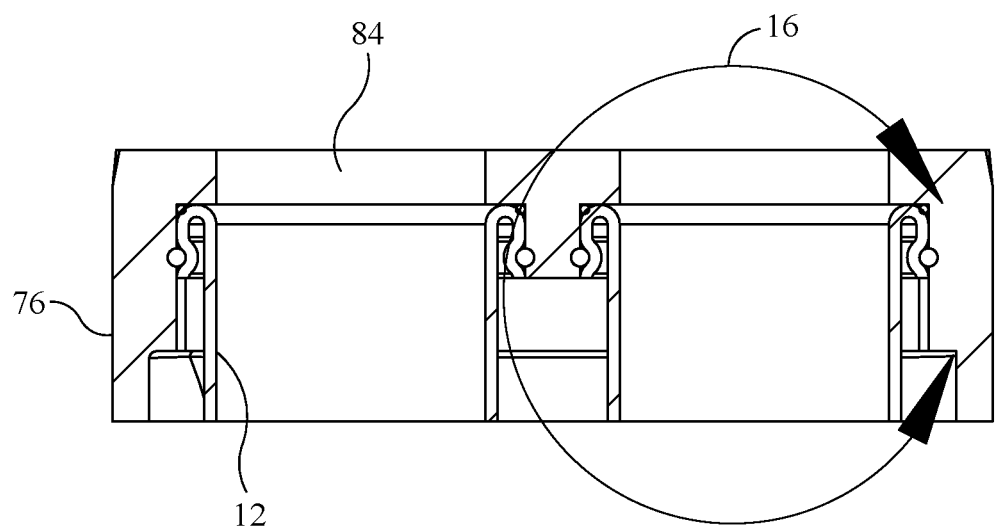
FIG. 15 is a partial cross sectional view cut through FIG. 14 of a second embodiment of a liquid cooled exhaust manifold in accordance with the present invention.
Figure 16:
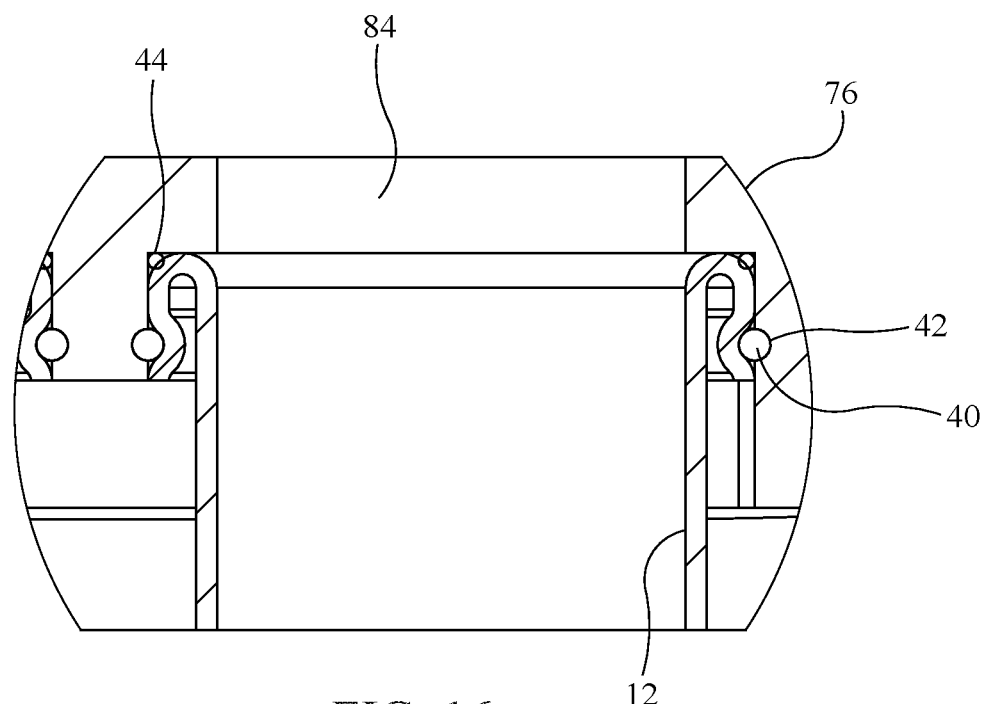
FIG. 16 is an enlarged cross sectional view cut through FIG. 15 of a liquid cooled exhaust manifold in accordance with the present invention.

With reference to FIGS. 8-11, a second embodiment of the liquid cooled exhaust manifold 2 preferably includes a dual open-ended manifold 52, the at least two exhaust tubes 12, an inlet tube plate 54 and the outlet tube plate 14. The dual open-ended manifold 52 includes an inner cavity 56. An inlet opening 58 is formed as an inlet to the dual open-ended manifold 52 and an exhaust opening 60 is formed as an outlet of the dual open-ended manifold 52. An inlet water threaded tap 62 is formed through the dual open-ended manifold 52, adjacent the inlet opening 58 and an outlet water threaded tap 64 is formed through the dual open-ended manifold, adjacent the outlet opening 60. With reference to FIG. 12, a plurality of bolt bosses 66 are formed around a perimeter of the inlet opening 58 to receive the plurality of threaded fasteners 50.

The inlet tube plate 54 includes at least two inlet tube bores 68, a plurality of fastener holes 70 and a plurality of clearance hole 71. The inlet tube plate 54 is sealed to the inlet opening 58 with a sealing component 72, such as a gasket or an o-ring and retained against the dual open-ended hollow housing 52 with a plurality of fasteners 74. The outlet tube plate 14 is sealed to the exhaust flange with the sealing component 34, such as a gasket or o-ring and retained against the dual open-ended manifold 52 with the plurality of fasteners 36. At assembly, one end of each exhaust tube 12 is inserted through the exhaust opening 60 and into one of the inlet tube bores 68 in the inlet tube plate 54. The inlet tube bore 68 is exactly the same as the exhaust tube bore 30 in the inlet tube plate 14. The at least two exhaust tube bores 30 in the outlet tube plate 14 are pushed over the opposing end of the at least two exhaust tubes 12. The outlet tube plate 14 is then fastened to the exhaust flange with the sealing component 34, the plurality of fasteners 36 and an optional exhaust gasket 46. The input plate 54 is attached to an exhaust manifold of an engine (not shown) with an inlet gasket 48 and a plurality of fasteners 50. A water supply tube (not shown) is threaded into the inlet water threaded tap 62 and a water return tube (not shown) is threaded into the outlet water threaded tap 64. The water supply tube and the water return tube circulate water through inner cavity 56 of the dual open-ended manifold 52.

With reference to FIGS. 13-16, a third embodiment of the liquid cooled exhaust manifold 3 preferably includes an inlet open-ended manifold 76, the at least two exhaust tubes 12 and the inlet tube plate 54. The inlet open-ended manifold 76 includes an inner cavity 78. An inlet opening 80 is formed as an inlet of the inlet open-ended manifold and an exhaust port 82 is formed as an outlet of the inlet open-ended manifold 76. The exhaust port 82 includes at least two exhaust tube bores 84 for receiving an opposing end of the at least two exhaust tubes 12. At assembly, an opposing end of each exhaust tube 12 is inserted through the inlet opening 80 and into one of the exhaust tube bores 84. The at least two inlet tube bores 68 in the inlet tube plate 54 are pushed over the one end of the at least two exhaust tubes 12. The inlet tube plate 54 is then fastened to the inlet of the inlet open-ended manifold 76 with the sealing component 72 and a plurality of fasteners 74. The inlet opening 80 of the inlet open-ended manifold 76 is attached to an exhaust manifold of an engine (not shown) with an inlet gasket 48 and a plurality of fasteners 50. The plurality of fasteners 50 are inserted through holes in the inlet open-ended manifold 76. A water supply tube (not shown) is threaded into an inlet water threaded tap 86 and a water return tube (not shown) is threaded into the outlet water threaded tap 88. The water supply tube and the water return tube circulate water through inner cavity 78 of the inlet open-ended manifold 76.

Figure 17:
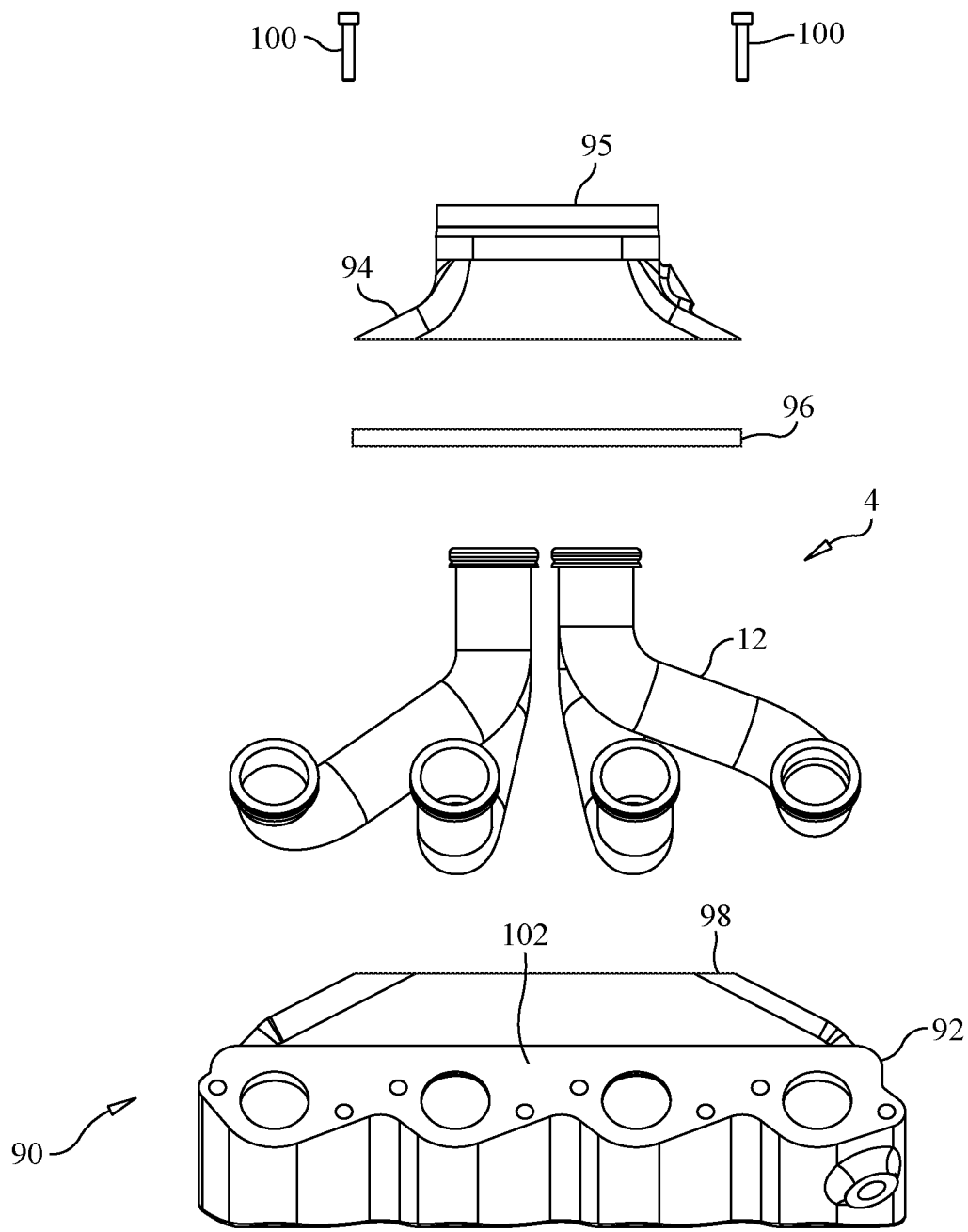
FIG. 17 is an exploded perspective view of a fourth embodiment of a liquid cooled exhaust manifold in accordance with the present invention.

A dual closed-ended manifold includes the inlet port 18, the inner cavity 16 and the exhaust port 82. With reference to FIG. 17, a fourth embodiment of a liquid cooled exhaust manifold 4 preferably includes a substantially horizontally split dual closed-ended manifold 90 and the at least two exhaust tubes 12. The substantially horizontally split dual closed-ended manifold 90 includes a base manifold member 92, a top manifold member 94 and a substantially horizontal split sealing gasket 96. The substantially horizontal split sealing gasket 96 is laid on a top mating surface 98 of the base manifold member 92. The top manifold member 94 is attached to the base manifold member 92 with a plurality of fasteners 100. One end of the at least two exhaust tubes 12 are inserted into the inlet port 102 and the opposing end of the at least two exhaust tubes 12 are retained in an exhaust port 95. The exhaust port 95 includes at least two exhaust tube bores (not shown) similar to the at least two exhaust tube bores 84 of the exhaust port 82.

Figure 18:
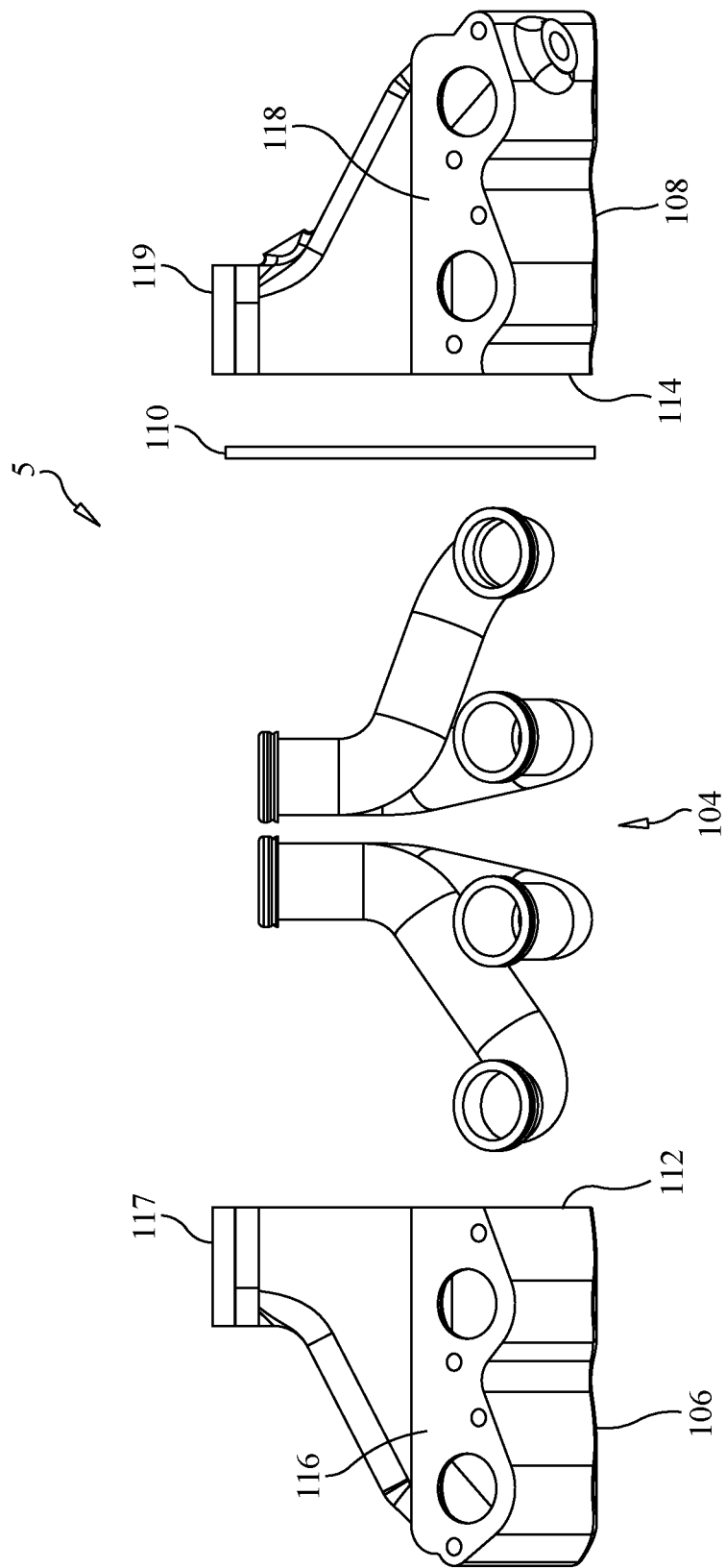
FIG. 18 is an exploded perspective view of a fifth embodiment of a liquid cooled exhaust manifold in accordance with the present invention.

With reference to FIG. 18, a fifth embodiment of a liquid cooled exhaust manifold 5 preferably includes a substantially vertically split dual closed-ended manifold 104 and the at least two exhaust tubes 12. The substantially vertically split dual closed-ended manifold 104 includes a first manifold member 106, a second manifold member 108 and a vertical split sealing gasket 110. The substantially vertical split sealing gasket 110 is laid on a first mating surface 112 of the first manifold member 106 or on a second mating surface 114 of the second manifold member 108. The first and second manifold members 106, 108 are preferably assembled to each other with a plurality of fasteners (not shown). One end of the at least two exhaust tubes 12 may be inserted into the first inlet port 116 of the first manifold member 108 and the second inlet port 118 of the second manifold member 108, before or after assembly. The opposing end of the at least two exhaust tubes 12 are retained in a first exhaust port 117 of the first manifold member 106 and a second exhaust port 119 of the second manifold member 108. The first exhaust port 117 includes at least one first exhaust tube bore (not shown) and the second manifold member 108 includes at least one second exhaust tube bore (not shown).

Figure 19:
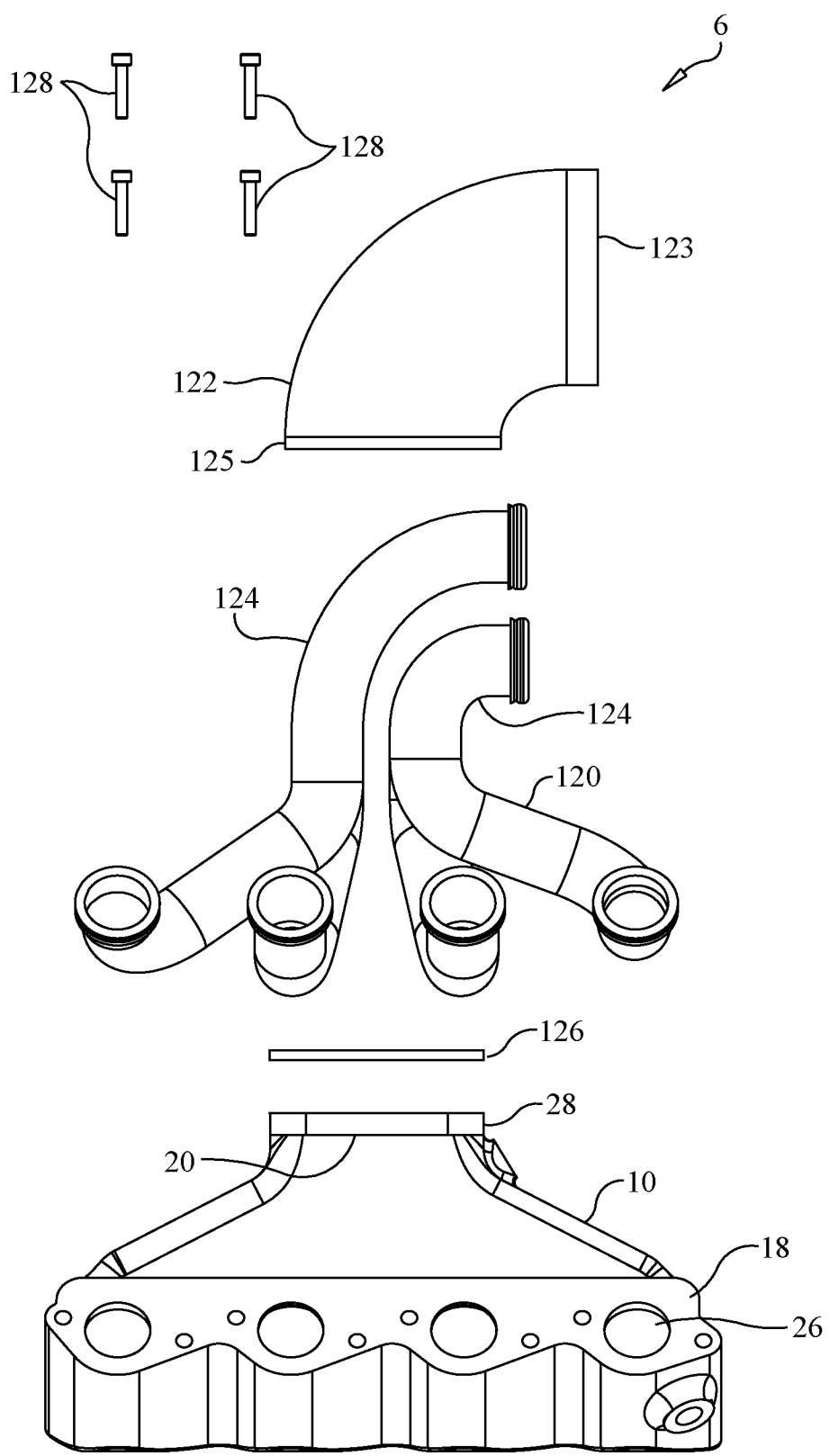
FIG. 19 is an exploded perspective view of a sixth embodiment of a liquid cooled exhaust manifold in accordance with the present invention.

With reference to FIG. 19, a sixth embodiment of a liquid cooled exhaust manifold 6 preferably includes the exhaust open-ended manifold 10, at least two top bent exhaust tubes 120 and an exhaust elbow 122. A preferable angular range of the exhaust elbow 122 is between 30-140 degrees. The top bent exhaust tube 120 includes the basic lower shape of the exhaust tube 12 plus an extended portion 124 in the form of an exhaust elbow. One end of the at least two bent exhaust tubes 120 are inserted through the exhaust opening 20 and into the at least two inlet tube bores 26 in the inlet port 18. The exhaust elbow 122 is slipped over an opposing end of the at least two bent exhaust tubes 120. A gasket 126 is placed between a bottom flange 125 of the exhaust elbow 122 and the exhaust flange 28. The exhaust elbow 122 is secured to the exhaust flange 28 with a plurality of fasteners 128. The opposing end of the at least two exhaust tubes 120 are retained in an exhaust port 123 of the exhaust elbow 122. The exhaust port 123 includes at least two exhaust tube bores (not shown) similar to the at least two exhaust tube bores 84 of the exhaust port 82.

Figure 20:
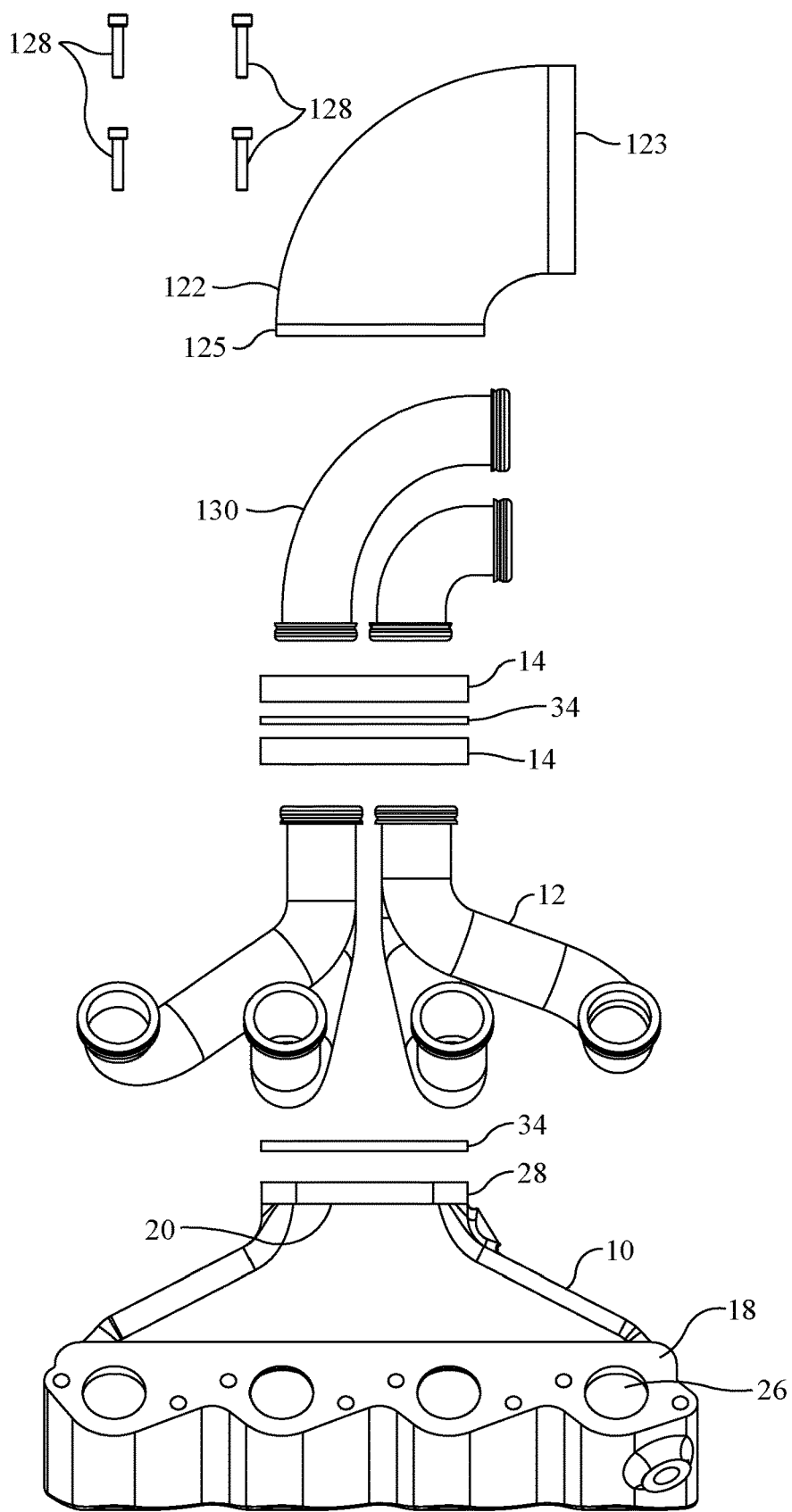
FIG. 20 is an exploded perspective view of a seventh embodiment of a liquid cooled exhaust manifold in accordance with the present invention.

With reference to FIG. 20, a seventh embodiment of a liquid cooled exhaust manifold 7 preferably includes the exhaust open-ended manifold 10, the at least two exhaust tubes 12, at least two exhaust elbow tubes 130 and the exhaust elbow 122. A preferable angular range of the exhaust elbow tubes 130 is between 30-140 degrees. One end of the at least two exhaust tubes 12 are inserted through the exhaust opening 20 and into the at least two inlet tube bores 26 in the inlet port 18. The opposing end of the at least two exhaust tubes 12 are inserted into a first outlet tube plate 14. A sealing component 34 is inserted between the first outlet tube plate 14 and a second outlet tube plate 14. One end of the at least two exhaust elbow tubes 130 are inserted into the second outlet tube plate 14. The exhaust elbow 122 is slipped over an opposing end of the at least two exhaust elbow tubes 130. The opposing end of the at least two exhaust elbow tubes 130 are retained in the exhaust port 123 of the exhaust elbow 122. A second sealing component 34 is inserted between a bottom of the exhaust elbow 122 and the exhaust flange 28 of the exhaust open-ended manifold 10. A bottom flange 125 of the exhaust elbow 122 is secured to the exhaust flange 28 of the exhaust open-ended manifold 10 with the plurality of fasteners 128.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A liquid cooled exhaust manifold comprising:
an exhaust open-ended manifold includes an inner cavity, an inlet and an outlet, said inlet is located on one end of said inner cavity, said outlet is located on an opposing end of said inner cavity, an inlet port is formed at said inlet, at least two inlet tube bores are formed in said inlet port, an exhaust opening is formed at said outlet;
at least two exhaust tubes are selectively removable from said exhaust open-ended manifold; and
an outlet tube plate includes at least one exhaust tube bore, wherein one end of said at least two exhaust tubes are inserted into said at least two inlet tube bores, said at least one exhaust tube bore is sealed to an opposing end of said at least two exhaust tubes, said outlet tube plate is secured to said outlet of said exhaust open-ended manifold, said outlet tube plate is selectively detachable from said outlet by a plurality of fasteners.

2. The liquid cooled exhaust manifold of claim 1 wherein:
an o-ring groove is formed on each end of said at least two exhaust tubes to receive an o-ring.

3. The liquid cooled exhaust manifold of claim 1, further comprising:
said inner cavity is filled with a liquid.

4. The liquid cooled exhaust manifold of claim 1, further comprising:
a sealing component is inserted between said outlet of said exhaust open-ended manifold and said outlet tube plate.

5. The liquid cooled exhaust manifold of claim 1, further comprising:
a corner o-ring is inserted at a bottom of said at least two inlet tube bores and said at least two exhaust tube bores.

6. The liquid cooled exhaust manifold of claim 1 wherein:
said at least two exhaust tubes are at least two top bent exhaust tubes; and
an exhaust elbow is slipped over one end of said at least two top bent exhaust tubes, said one end of said at least two top bent exhaust tubes are retained in said exhaust elbow, said outlet tube plate is replaced with said exhaust elbow, said exhaust elbow is secured to said exhaust open-ended manifold, an opposing end of said at least two top bent exhaust tubes are inserted into said inlet port.

7. The liquid cooled exhaust manifold of claim 1 wherein:
at least two exhaust elbow tubes having one end secured to an opposing end of said at least two exhaust tubes; and
an exhaust elbow is slipped over an opposing end of said at least two exhaust elbow tubes, said opposing end of said at least two exhaust elbow tubes are retained in said exhaust elbow, said exhaust elbow is secured to said exhaust open-ended manifold.

8. A liquid cooled exhaust manifold comprising:
a dual open-ended manifold includes an inner cavity, an inlet and an outlet, said inlet is located on one end of said inner cavity, said outlet is located on an opposing end of said inner cavity, an inlet opening is formed at said inlet, an exhaust opening is formed at said outlet;
at least two exhaust tubes are selectively removable from said exhaust open-ended manifold;
an inlet tube plate includes at least two inlet tube bores, said inlet tube plate is attached to said dual open-ended manifold to cover said inlet opening, said inlet tube plate is selectively detachable from said inlet; and
an outlet tube plate includes at least one exhaust tube bore, wherein one end of said at least two exhaust tubes are inserted into said at least two inlet tube bores, said at least one exhaust tube bore is sealed to an opposing end of said at least two exhaust tubes, said outlet tube plate is attached to said outlet of said dual open-ended manifold, said outlet tube plate is secured to said outlet of said exhaust open-ended manifold, said outlet tube plate is selectively detachable from said outlet by a plurality of fasteners.

9. The liquid cooled exhaust manifold of claim 8 wherein:
an o-ring groove is formed on each end of said at least two exhaust tube to receive an o-ring.

10. The liquid cooled exhaust manifold of claim 8, further comprising:
said inner cavity is filled with a liquid.

11. The liquid cooled exhaust manifold of claim 8, further comprising:
a sealing component is inserted between said inlet of said exhaust open-ended manifold and said inlet tube plate,
a sealing component is inserted between said outlet of said exhaust open-ended manifold and said outlet tube plate.

12. The liquid cooled exhaust manifold of claim 8, further comprising:
a corner o-ring is inserted at a bottom of said at least two inlet tube bores and said at least two exhaust tube bores.

13. A liquid cooled exhaust manifold comprising:
an exhaust open-ended manifold includes an inner cavity, an inlet and an outlet port, said inlet is located on one end of said inner cavity, said outlet is located on an opposing end of said inner cavity, an inlet opening is formed at said inlet, at least one exhaust tube bore is formed in said outlet port;
at least two exhaust tubes are selectively removable from said exhaust open-ended manifold; and
an inlet tube plate includes at least two inlet tube bores, wherein one end of said at least one exhaust tube bore is sealed to an opposing end of said at least two exhaust tubes, an opposing end of said at least two inlet tubes are inserted into said at least two inlet tube bores, said inlet tube plate is secured to said inlet of said exhaust open-ended manifold, said inlet tube plate is selectively detachable from said inlet by a plurality of fasteners.

14. The liquid cooled exhaust manifold of claim 13 wherein:
an o-ring groove is formed on each end of said at least two exhaust tube to receive an o-ring.

15. The liquid cooled exhaust manifold of claim 13, further comprising:
said inner cavity is filled with a liquid.

16. The liquid cooled exhaust manifold of claim 13, further comprising:
a sealing component is inserted between said outlet of said exhaust open-ended manifold and said outlet tube plate.

17. A liquid cooled exhaust manifold comprising:
a dual closed-ended manifold includes an inner cavity, an inlet and an outlet, said inlet is located on one end of said inner cavity, said outlet is located on an opposing end of said inner cavity, an inlet port is formed at said inlet, and an exhaust port is formed at said outlet, at least two inlet tube bores are formed in said inlet port, at least one exhaust tube bore is formed in said outlet port; and
at least two exhaust tubes are selectively removable from said exhaust open-ended manifold, an access structure is formed in said dual closed-ended manifold to allow the insertion of said at least two exhaust tubes into said dual closed-ended manifold, one end of said at least two exhaust tubes extends from said inlet, an opposing end of said at least two exhaust tubes extends to said outlet, said access structure is selectively detachable from said closed-ended manifold by a plurality of fasteners.

18. The liquid cooled exhaust manifold of claim 17 wherein:
said access structure is splitting in a substantially horizontal plane said dual closed-ended manifold to form a base manifold member and a top manifold member in said dual closed-ended manifold.

19. The liquid cooled exhaust manifold of claim 17 wherein:
said access structure is split in a substantially vertical plane to form a first manifold member and a second manifold member in said dual closed-ended manifold, said first manifold member is selectively detachable from said second manifold member.

20. The liquid cooled exhaust manifold of claim 17 wherein:
said access structure is an access port formed in said dual closed-ended manifold sealed with an access plate.

* * * * *